June 30, 1931.  E. R. MORTON  1,811,860
REGULATOR SYSTEM
Filed May 25, 1929
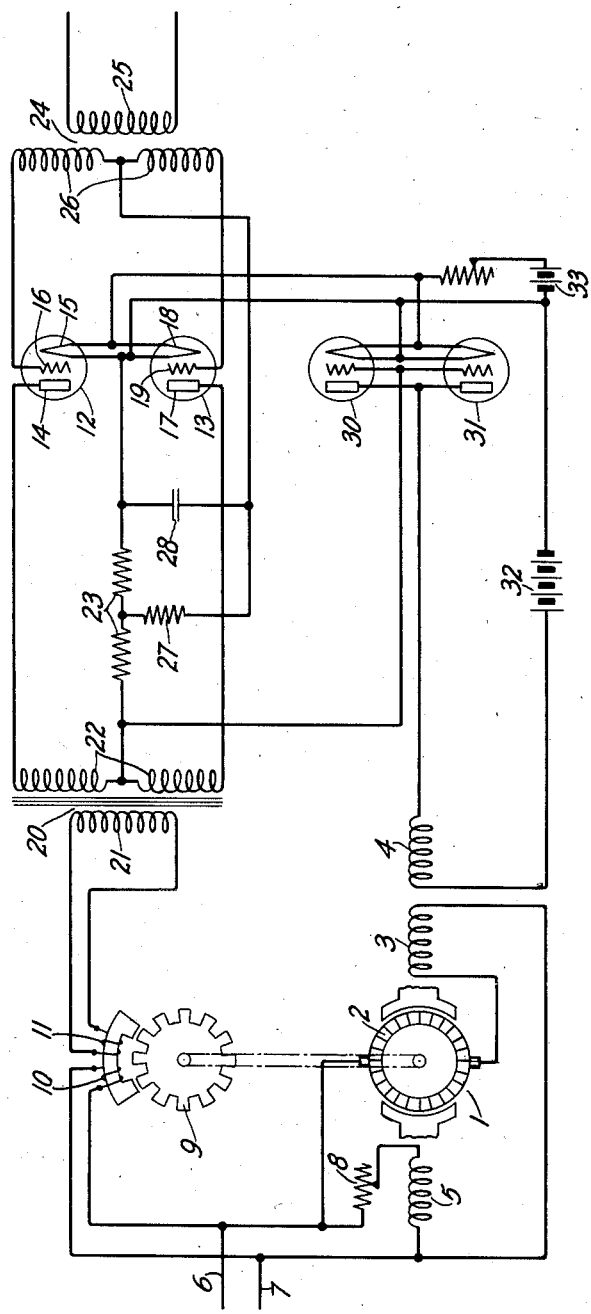
INVENTOR
E. R. MORTON
BY Wayne B Wells
ATTORNEY Patented June 30, 1931

1,811,860

UNITED STATES PATENT OFFICE

EDMUND R. MORTON, OF BROOKLYN, NEW YORK, ASSIGNOR TO BELL TELEPHONE LABORATORIES, INCORPORATED, OF NEW YORK, N. Y., A CORPORATION OF NEW YORK

REGULATOR SYSTEM

Application filed May 25, 1929. Serial No. 365,904.

This invention relates to regulator systems and particularly to anti-hunting means for motor speed regulator systems.

One object of the invention is to provide a dynamo-electric machine with a regulator system controlled by a constant-frequency source of alternating current that shall have improved means for preventing hunting action.

Another object of the invention is to provide a motor speed regulator system having a phase detector tube for controlling the motor field excitation to govern the motor speed that shall have means controlling the grid of the detector tube from the plate circuit thereof for applying a large corrective excitation to the motor upon tendency of the motor to change speed and gradually reduce the corrective excitation.

A further object of the invention is to provide a regulator system of the above indicated character that shall have a resistance element shunted by a condenser in the plate circuit of the phase detector tube for controlling the potential on the phase detector grid to apply a large corrective field excitation to the motor upon tendency of the motor to change speed and gradually reduce the corrective excitation.

In regulator systems which are quick-acting and very sensitive to changes in the characteristic being controlled and especially in chronometric regulator systems, it is essential to provide the system with stabilizing means to prevent hunting action. Vacuum tube regulator systems are free from any moving parts and are generally very quick-acting. The present invention concerns a vacuum tube regulator system of the chronometric type which is controlled by a separate external oscillator or other constant frequency source of current.

In the system shown for disclosing the invention a phase detector tube is provided for controlling the excitation of a motor to maintain the motor speed substantially constant. The grid circuit of the phase detector tube is connected to an oscillator producing a constant-frequency alternating current. The plate of the phase detector tube has an alternating potential impressed thereon which varies according to the speed of the motor. The excitation of the motor field winding is controlled in accordance with the phase relation between the alternating potentials impressed on the grid and plate of the phase detector tube. A system of this type is very sensitive and means must be provided for stabilizing the regulating action to prevent the so-called hunting action.

The regulator system comprises a direct current motor directly connected to a pilot generator which produces an alternating current having a frequency varying according to the motor speed. The motor is provided with a regulating field winding for controlling the motor speed. The alternating current generator impresses an alternating potential on the plate of a phase detector tube. The grid of the phase detector tube has an alternating potential impressed thereon from an oscillator which produces a current having a constant frequency. The phase detector tube, which is operated in accordance with the phase relation between the potentials impressed upon the grid and plate thereof, is coupled to a thermionic amplifier. The thermionic amplifier controls the excitation of the motor regulating field winding. The alternating potential supplied to the grid of the phase detector tube being constant, it is apparent that the output from the phase detector tube will be controlled in accordance with the variation in phase angle between the potential impressed upon the plate thereof from the pilot generator and that applied to the grid. The phase angle between potential impressed on the plates by the pilot generator and the potential impressed on the grids varies according to the instantaneous speed of the motor. Consequently, it is apparent that the phase detector tube controls the excitation of the motor in accordance with the variations in speed of the motor. A similar regulator system is disclosed in the application of E. C. Manderfeld, Serial No. 256,522, filed February 24, 1928.

In order to stabilize the regulating action, a biasing potential is impressed on the grid of the phase detector tube from a resistance element in the plate circuit of such tube through another resistance, and a condenser of relatively large capacity is shunted across these resistance elements. The condenser serves to insure the applying of a relatively large corrective excitation to the regulating field winding upon tendency of the motor to change speed and to gradually reduce the corrective excitation to a new equilibrium value. Upon tendency of the motor to change speed the condenser will act to maintain the previous grid potential on the grids of the phase detector tubes by the circuit around the grid biasing resistance. The change in the plate current of the detector tube will therefore be accentuated as compared with the change which would take place if the condenser were omitted. The condenser slowly varies its charge to gradually reduce the corrective potential impressed on the grid of the phase detector tube, finally reaching a new equilibrium value.

The resistance element shunted by a condenser which connects the grid element of the phase detector tube to the plate circuit serves to prevent hunting action in a manner similar to tangential inertia in a mechanical governor. A large corrective excitation is applied to the motor at the beginning of a tendency of the motor to change speed and then the corrective excitation tends to gradually reduce. The regulator system is of the chronometric type. The speed of the motor must be so maintained that when the corrective force tends to be reduced, the phase angle between the potentials impressed on the grids and plates of the phase detector tubes is gradually changed sufficiently to permit the regulating effect to be that necessary to maintain synchronism with the control frequency source.

The single figure in the accompanying drawing is a diagrammatic view of a regulator system constructed in accordance with the invention.

Referring to the drawing, a motor 1 comprising an armature 2, a series field winding 3, a regulating field 4 and a shunt field winding 5 is connected to a direct-current supply circuit comprising conductors 6 and 7. The shunt field winding 5 is connected across the supply conductors 6 and 7 in series with an adjustable resistance element 8.

The motor 1 is directly connected to an alternating current generator 9 of the inductor type. The generator 9 comprises a field winding 10 which is connected across the supply conductors 6 and 7 and an armature winding 11. In the system disclosed the generator 9 is designed to develop an alternating current having a frequency of substantially 720 cycles when the motor is operating at normal speed.

Two phase detector tubes 12 and 13, which are connected in push-pull relationship, are provided for controlling the excitation of the regulating field winding 4 in accordance with the frequency of current developed by the generator 9. The phase detector tube 12 comprises a plate 14, a filament 15, and a grid 16. The phase detector tube 13 comprises a plate 17, a filament 18 and a grid 19. A transformer 20 having a primary winding 21 and a divided secondary winding 22 is provided for connecting the plates of the tubes 12 and 13 to the armature circuit of the generator 9. The plates 14 and 17 are connected to opposite terminals of the secondary winding 22 and the filaments 15 and 18 are connected to a central tap from the secondary winding through a coupling resistance 23. In the above connections it is apparent that alternating potentials are impressed on the plates 14 and 17 of the phase detector tubes according to the frequency of the current produced by the generator 9 and also according to the speed of the motor 1.

A transformer 24 comprising primary winding 25 and divided secondary winding 26 is provided for connecting the grids 16 and 19 of the phase detector tubes to an oscillator (not shown). The oscillator, which may be of any suitable type, is assumed to develop an alternating current having a standard or constant frequency of substantially 720 cycles. Opposite terminals of the secondary winding 26 are connected to the grids 16 and 19 of the phase detector tubes 12 and 13. A central tap from the secondary winding 26 is connected to the plate circuit of the detector tubes through a resistance element 27 and a condenser 28 of relatively large capacity. The resistance element 27 is connected to an intermediate tap on the coupling resistance element 23 and the condenser 28 is connected in shunt around one section of the coupling resistance 23 and the resistance element 27. The condenser 28 in shunt to the resistance serves to prevent hunting action by the regulator in a manner to be more fully set forth hereinafter. The connection of the secondary winding 26 to the coupling resistance 23 serves to supply a negative biasing potential to the grids 16 and 19 of the phase detector tubes.

Two amplifier tubes 30 and 31, which are connected in parallel circuit relation, are coupled to the phase detector tubes 12 and 13 by means of the coupling resistance 23. The output circuit for the amplifier tubes 30 and 31 is connected to the regulating field winding 4. A battery 32 of substantially 400 volts is provided for supplying plate potential to the amplifier tubes 30 and 31. A battery 33 of substantially 6½ volts is provided for supplying filament current to the amplifier tubes 30 and 31 and the phase detector tubes 12 and 13.

If the speed of the motor 1 tends to increase, the frequency of the current developed by the pilot generator 9 tends to increase to change the phase relation between the potentials impressed on the plates and grids of the phase detector tubes 12 and 13. The output from the phase detector tubes varies in accordance with the phase relation between the alternating potentials impressed upon the grids and plates of the tubes. Accordingly, the potential drop across the coupling resistance 23 varies in accordance with the phase relation between the potentials on the grids and plates of the tubes. An increase in the frequency of the current developed by the generator 9 lowers the output from the phase detector tubes 12 and 13 to lower the negative potential impressed on the grids of the amplifier tubes 30 and 31. The space current flow through the amplifier tubes 30 and 31 is raised to increase the excitation of the regulating field winding 4 and oppose the tendency of the motor to increase in speed.

The change in the plate current for the phase detector tubes 12 and 13 varies the charge on the condenser 28. The condenser acts to maintain temporarily the same potential on the grids of the phase detector tubes as that impressed on them prior to the change in plate current for the tubes. The holding of the grid biasing potential contant insures a relatively large change in the voltage drop across the coupling resistance 23 and a large corrective excitation for the motor 1. The large corrective excitation opposes the tendency of the motor to increase in speed. In the condition under consideration where the speed of the motor is assumed to tend to increase, the phase angle between the potentials on the grids and plates of the phase detector tubes is changed to lower the voltage drop across the coupling resistance 23. The change in the voltage drop across the resistance element 23 at first effects no change in the biasing potential impressed on the grids 16 and 19 of the phase detector tubes 12 and 13 by reason of the gradual discharge of the condenser 28. At this time a relatively large corrective excitation is applied to the motor 1. The gradual discharge of the condenser 28 permits a slow change of the biasing potential impressed on the grids of the phase detector tubes by the resistance element 23 until a new equilibrium value is reached. The phase angle between the potentials impressed on the grids and the plates of the phase detector tubes upon change in the corrective force is gradually varied sufficiently to maintain synchronism with the control frequency.

If the motor 1 tends to decrease in speed the frequency developed by the pilot generator 9 is lowered. The lowering of the frequency of the alternating potential impressed on the plates of the phase detector tubes changes the phase relation between the alternating potentials impressed on the grids and plates of such tubes to raise the output from the phase detector tubes. The potential drop across the coupling resistance 23 is raised to increase the negative potential impressed on the grids of the amplifier tubes 30 and 31. The output current from the amplifier tube is lowered for lowering the excitation of the regulating field winding 4 to oppose the tendency of the motor to decrease in speed.

Upon increase in the potential drop across the resistance element 23 in the condition under consideration the condenser 28 is gradually charged and temporarily prevents the changing of the biasing potential impressed on the grids of the phase detector tubes. This insures a relatively large corrective excitation on the motor 1 to oppose the tendency to decrease in speed. As the condenser 28 gradually is charged the biasing potential impressed on the detector grids through the resistance 27 is raised to lower gradually the plate current of the phase detector tubes and therefore to lower the corrective excitation applied to the motor. The phase angle between the potentials impressed on the grids and plates of the phase detector tubes upon change in the corrective force is gradually varied sufficiently to maintain synchronism with the control frequency.

Modifications in the system and in the arrangement and location of parts may be made within the spirit and scope of the invention and such modifications are intended to be covered by the appended claims.

What is claimed is:

1. In combination a dynamo-electric machine, means comprising a detector for regulating said machine to maintain a characteristic thereof constant, and auxiliary means operating on said detector upon tendency of the machine characteristic to change for applying a relatively large corrective force to said machine to return the characteristic thereof to normal and for gradually reducing the corrective force.

2. In combination a motor having a regulating field winding, means comprising a detector operated according to the motor speed for governing the excitation of said field winding to maintain the motor speed constant, and auxiliary means operating on said detector upon tendency of the motor to change speed for insuring a relatively large corrective excitation on said field winding and for gradually reducing the corrective excitation to a new equilibrium value.

3. In combination a motor having a regulating field winding, means comprising a three-element space discharge tube operated according to the motor speed for governing the excitation of said field winding to maintain the motor speed constant, means for impressing a negative biasing potential on the grid of said tube from the output circuit thereof, and means for controlling said grid biasing means to effect a relatively large corrective excitation to said field winding upon tendency of the motor to change speed and to gradually reduce the corrective excitation.

4. In a regulator system, a motor having a regulating field winding, means comprising a three-element space discharge device operated according to the motor speed for controlling said field winding to maintain the motor speed constant, and means in the plate circuit of said device for governing the potential on the grid thereof to apply a relatively large corrective excitation to said field winding upon tendency of the motor to change speed and to gradually reduce the corrective excitation.

5. In a regulator system, a dynamo-electric machine, means comprising a three-element space discharge device operated according to a characteristic of the machine for controlling the machine to maintain the characteristic thereof constant, and means in the plate circuit of said device for governing the potential on the grid thereof to apply a relatively large corrective force to said machine upon tendency of the characteristic thereof to change and to gradually reduce the corrective force.

6. In a regulator system, a dynamo-electric machine, means comprising a three-element space discharge device operated according to a characteristic of the machine for controlling the machine to maintain the characteristic thereof constant, and means comprising a resistance element shunted by a condenser in the plate circuit of said device for governing the potential on the grid thereof to apply a relatively large corrective force to said machine upon tendency of the characteristic thereof to change and to gradually reduce the corrective force.

7. In combination a dynamo-electric machine, means comprising a detector responsive to variation in a characteristic of said machine for controlling the machine to maintain the characteristic thereof constant, and means operating on said detector upon a tendency of the machine characteristic to change for applying a relatively large corrective force to said machine and for gradually reducing the corrective force.

8. In a regulator system, a motor having a regulating field winding, means comprising a three-element space discharge device operated according to the motor speed for controlling said field winding to maintain the motor speed constant, means for impressing a negative biasing potential on the grid of said device from the output circuit of the device, and means comprising a capacity element for controlling said grid biasing means to insure a relatively large corrective excitation for said field winding upon tendency of the motor to change speed and to gradually reduce the corrective excitation.

9. In a regulator system, a dynamo-electric machine having a regulating field winding, means comprising a three-element space discharge tube operated according to a characteristic of the machine for controlling said field winding to maintain the machine characteristic constant, means comprising a resistance element in the output circuit of said tube for impressing a negative biasing potential on the grid of the tube, and means comprising a condenser shunted across said resistance element for governing the potential on said grid to insure applying a relatively large corrective excitation to said field winding upon tendency of the machine characteristic to change and for gradually reducing the corrective excitation.

10. In a regulator system, a motor having a regulating field winding, a pilot generator operated by said motor for developing a current having a frequency varying according to the motor speed, a three-element phase detector tube having an alternating potential impressed on the plate thereof from said generator, a source of standard frequency current impressing an alternating potential on the grid of the phase detector tube, means for controlling the excitation of said field winding according to the phase relation between the potentials impressed on the grid and plate of said phase detector tube, and means in the plate circuit of said phase detector tube for governing the potential on the grid thereof to insure the applying of a relatively large corrective excitation to said field winding upon tendency of the motor to change speed with respect to the standard frequency and to gradually reduce the corrective excitation.

11. In a regulator system, a motor having a regulating field winding, a pilot generator operated by said motor for developing a current having a frequency varying according to the motor speed, a three-element phase detector tube, a source of alternating potential having a standard frequency impressed on the grid of said phase detector tube, the plate of said phase detector tube having an alternating potential impressed thereon by said pilot generator, means for controlling the excitation of said field winding according to the phase relation between the potentials impressed on the grid and plate of said phase detector tube, means for impressing a negative biasing potential on the grid of said detector tube from the output circuit thereof, and means for controlling said grid biasing means to insure a relatively large corrective excitation on said field winding upon tendency of the motor to change speed and to gradually reduce the corrective excitation.

12. In combination a motor having a regulating field winding, a pilot generator producing a current having a frequency varying according to the motor speed, a three-element phase detector tube having an alternating potential impressed on the plate thereof from said generator, a source of standard frequency alternating current for impressing an alternating potential on the grid of said tube, means comprising a resistance element in the output circuit of said tube for impressing a negative biasing potential on the grid thereof, means controlled by said tube in accordance with the phase relation between the potentials impressed on the grid and plate for controlling said field winding to maintain the motor speed constant, and means comprising a condenser shunted across said resistance element for insuring the applying of a relatively large corrective excitation to said field winding upon tendency of the motor to change speed and for gradually reducing the corrective excitation.

In witness whereof, I hereunto subscribe my name this 24th day of May, 1929.

EDMUND R. MORTON.